US010366186B2

(12) United States Patent
Mautner et al.

(10) Patent No.: US 10,366,186 B2
(45) Date of Patent: Jul. 30, 2019

(54) SYSTEM AND PROCESS FOR SIMULATING THE BEHAVIORAL EFFECTS OF TIMING VIOLATIONS BETWEEN UNRELATED CLOCKS

(71) Applicant: THE CHARLES STARK DRAPER LABORATORY, INC., Cambridge, MA (US)

(72) Inventors: Eric Karl Mautner, Hudson, MA (US); Wolf Johnson, Framingham, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 58 days.

(21) Appl. No.: 15/276,035

(22) Filed: Sep. 26, 2016

(65) Prior Publication Data
US 2017/0091361 A1 Mar. 30, 2017

Related U.S. Application Data

(60) Provisional application No. 62/232,549, filed on Sep. 25, 2015.

(51) Int. Cl.
*G06F 17/50* (2006.01)
(52) U.S. Cl.
CPC ...... *G06F 17/5031* (2013.01); *G06F 2217/62* (2013.01); *G06F 2217/84* (2013.01)

(58) Field of Classification Search
CPC ............. G06F 17/5031; G06F 2217/62; G06F 2217/84
See application file for complete search history.

(56) References Cited

U.S. PATENT DOCUMENTS

2014/0325463 A1* 10/2014 Bahadra .............. G06F 17/5031
716/108
2016/0103943 A1* 4/2016 Xia ..................... G06F 17/5081
716/108

* cited by examiner

*Primary Examiner* — Vuthe Siek
(74) *Attorney, Agent, or Firm* — Lando & Anastasi, LLP

(57) ABSTRACT

According to one aspect, embodiments of the invention provide a CDC simulation system comprising a timing analysis module configured to receive a circuit design, analyze the circuit design to identify at least one CDC, and generate a report including information related to the at least one CDC, a CDC simulation module configured to communicate with the timing analysis module and to receive the report from the timing analysis module, and a test bench module configured to communicate with the CDC simulation module, to receive the circuit design, and to operate a test bench code to simulate the operation of the circuit design, wherein the CDC simulation module is further configured to edit a top level of the test bench code, based on the received report, such that the test bench module is configured to identify timing violations in the circuit design due to the at least one CDC.

12 Claims, 7 Drawing Sheets

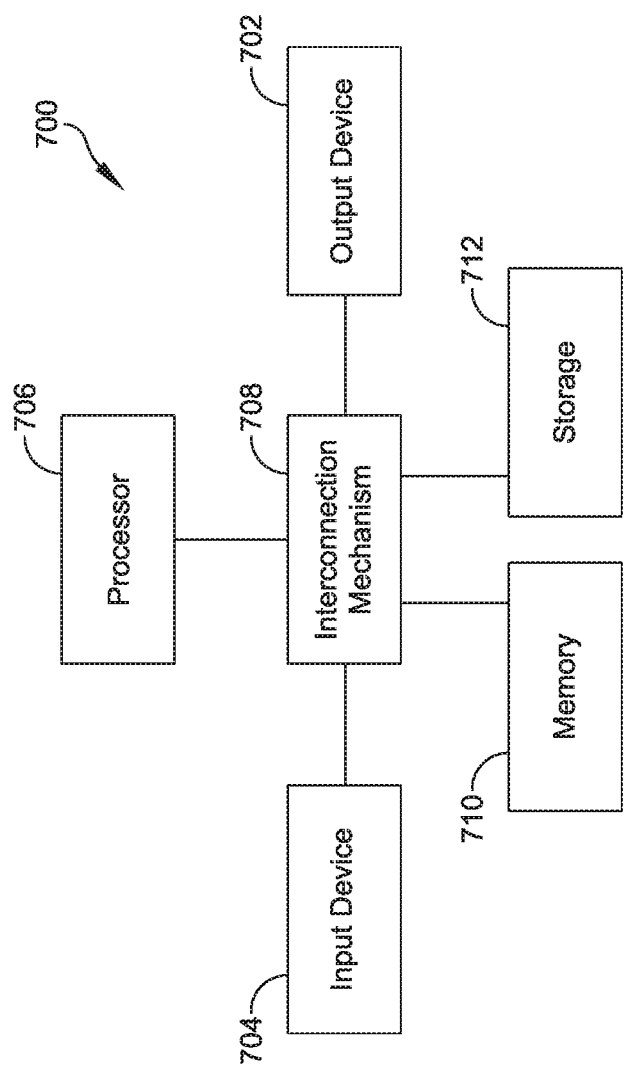

SYSTEM AND PROCESS FOR SIMULATING THE BEHAVIORAL EFFECTS OF TIMING VIOLATIONS BETWEEN UNRELATED CLOCKS

CROSS REFERENCE TO RELATED APPLICATION

This application claims priority to U.S. Provisional Application Ser. No. 62/232,549 entitled "PROCESS FOR SIMULATING THE BEHAVIORAL EFFECTS OF TIMING VIOLATIONS BETWEEN UNRELATED CLOCKS," filed on Sep. 25, 2015, which is incorporated herein by reference in its entirety.

BACKGROUND

The present disclosure generally relates to the simulation/verification of Hardware Description Language (HDL) based circuit designs (e.g., Application-Specific Integrated Circuit (ASIC) or Field-Programmable Gate Array (FPGA) circuit designs). Such HDL based circuit designs often include different types of clocks. For example, an HDL based circuit design can include synchronous clocks, synchronous derivative clocks, and asynchronous clocks. A clock is considered synchronous when a source element and a destination element have the same clock. When a source element and a destination element have different clocks that are derived from the same source, the clocks are considered synchronous derivate clocks. When a source clock and a destination clock originate from different clocking elements, the source and destination clocks are considered asynchronous. Asynchronous clocks can have the same or a different frequency.

SUMMARY

One aspect of the present disclosure is directed to a Clock Domain Crossing (CDC) simulation system comprising an interface configured to communicate with an external system and to receive a Behavioral Description Language (BDL) based circuit design from the external system, a timing analysis module configured to receive the BDL based circuit design from the interface, analyze the BDL based circuit design to identify at least one CDC within the circuit design, and generate a report including information related to the at least one CDC, a CDC simulation module configured to communicate with the timing analysis module and to receive the report from the timing analysis module, and a test bench module configured to communicate with the CDC simulation module and the interface, to receive the BDL based circuit design from the interface, and to operate a test bench code to simulate the operation of the BDL based circuit design, wherein the CDC simulation module is further configured to edit a top level of the test bench code, based on the received report, such that the test bench module is configured to identify timing violations in the BDL based circuit design due to the at least one CDC.

According to one embodiment, the BDL based circuit design is a Hardware Description Language (HDL) based circuit design. In another embodiment, the HDL based circuit design is an HDL based circuit design of a Field-Programmable Gate Array (FPGA).

According to another embodiment, in analyzing the BDL based circuit design to identify the at least one CDC within the circuit design, the timing analysis module is further configured to identify a source element of the at least one CDC having a first output, identify a destination element of the at least one CDC having a second output, identify a first clock of the source element, identify a second clock of the destination element, the first clock and the second clock being asynchronous, and include identifications of the source element, the destination element, the first clock, and the second clock in the report.

According to one embodiment, in editing the top level of the test bench code, based on the received report, such that the test bench module is configured to identify timing violations in the BDL based circuit design as a result of the at least one CDC, the CDC simulation module is further configured to edit the top level of the test bench code such that the test bench module is configured to monitor the first output of the source element, monitor the second clock of the destination element, and identify timing violations in the BDL based circuit design based on the first output of the source element and the second clock of the destination element. In one embodiment, in editing the top level of the test bench code such that the test bench module is configured to identify timing violations in the BDL based circuit design based on the first output of the source element and the second clock of the destination element, the CDC simulation module is further configured to edit the top level of the test bench code such that the test bench module is configured to determine whether the first output of the source element has been stable for a minimum setup period of time before an active edge of the second clock of the destination element, and identify a setup timing violation in response to a determination that the first output of the source element has not been stable for the minimum setup period of time before the active edge of the second clock of the destination element.

According to another embodiment, in editing the top level of the test bench code such that the test bench module is configured to determine whether the first output of the source element has been stable for a minimum setup period of time before an active edge of the second clock of the destination element, the CDC simulation module is further configured to edit the top level of the test bench code such that the test bench module is configured to timestamp a change in the first output of the source element, identify the active edge of the second clock of the destination element, and determine whether an amount of time between the timestamped change in the first output of the source element and the identified active edge of the second clock of the destination element is greater than the minimum setup period of time. In one embodiment, in editing the top level of the test bench code such that the test bench module is configured to identify the setup timing violation in response to the determination that the first output of the source element has not been stable for the minimum setup period of time before the active edge of the second clock of the destination element, the CDC simulation module is further configured to edit the top level of the test bench code such that the bench module is configured to identify the setup timing violation in response to the amount of time between the timestamped change in the first output of the source element and the identified active edge of the second clock of the destination element being less than the minimum setup period of time, and provide an indication of the setup timing violation.

According to one embodiment, in editing the top level of the test bench code such that the test bench module is configured to identify timing violations in the BDL based circuit design based on the first output of the source element and the second clock of the destination element, the CDC simulation module is further configured to edit the top level of the test bench code such that the test bench module is configured to determine whether the first output of the source element has been stable for a minimum hold period of time after an active edge of the second clock of the destination element, and identify a hold timing violation in response to a determination that the first output of the source element has not been stable for the minimum hold period of time after the active edge of the second clock of the destination element. In another embodiment, in editing the top level of the test bench code such that the test bench module is configured to determine whether the first output of the source element has been stable for a minimum hold period of time after an active edge of the second clock of the destination element, the CDC simulation module is further configured to edit the top level of the test bench code such that the test bench module is configured to timestamp the active edge of the second clock of the destination element, identify a change in the first output of the source element, and determine whether an amount of time between the timestamped active edge of the second clock of the destination element and the change in the first output of the source element is greater than the minimum hold period of time.

According to another embodiment, in editing the top level of the test bench code such that the test bench module is configured to identify the hold timing violation in response to the determination that the first output of the source element has not been stable for the minimum hold period of time after the active edge of the second clock of the destination element, the CDC simulation module is further configured to edit the top level of the test bench code such that the bench module is configured to identify the hold timing violation in response to the amount of time between the timestamped active edge of the second clock of the destination element and the change in the first output of the source element is less than the minimum hold period of time, and provide an indication of the setup timing violation.

According to one embodiment, the CDC simulation module is further configured to edit the top level of the test bench code such that the test bench module is configured to force a random value onto the output of the destination element of the at least one CDC in response to identifying at least one timing violation in the BDL based circuit design due to the at least one CDC. In another embodiment, the CDC simulation module is further configured to edit the top level of the test bench code such that the test bench module is configured to force an indeterminate onto the output of the destination element of the at least one CDC in response to identifying at least one timing violation in the BDL based circuit design due to the at least one CDC.

Another aspect of the present disclosure is directed to a method for simulating the behavior of Clock Domain Crossings (CDC) in a BDL based circuit design, the method comprising receiving the BDL based circuit design, analyzing the BDL based circuit design to identify information related to at least one CDC within the circuit design, operating a test bench code of a test bench module to simulate operation of the BDL based circuit design, inserting code into a top level of the test bench code based on the information related to the at least one CDC within the circuit design, and instantiating the inserted code into lower levels of the circuit design to identify timing violations in the BDL based circuit design due to the at least one CDC.

According to one embodiment, analyzing the BDL based circuit design to identify information related to at least one CDC within the circuit design includes identifying a source element of the at least one CDC having a first output, a destination element of the at least one CDC having a second output, identifying a first clock of the source element, and identifying a second clock of the destination element, the first clock and the second clock being asynchronous. In another embodiment, instantiating the inserted code into the lower levels of the circuit design to identify timing violations in the BDL based circuit design due to the at least one CDC includes monitoring the first output of the source element, monitoring the second clock of the destination element, and identifying timing violations in the BDL based circuit design based on the first output of the source element and the second clock of the destination element.

According to another embodiment, identifying timing violations in the BDL based circuit design based on the first output of the source element and the second clock of the destination element includes determining whether the first output of the source element has been stable for a minimum setup period of time before an active edge of the second clock of the destination element, identifying a setup timing violation in response to a determination that the first output of the source element has not been stable for the minimum setup period of time before the active edge of the second clock of the destination element, and providing an indication of the setup timing violation. In another embodiment, identifying timing violations in the BDL based circuit design based on the first output of the source element and the second clock of the destination element includes determining whether the first output of the source element has been stable for a minimum hold period of time after an active edge of the second clock of the destination element, identifying a hold timing violation in response to a determination that the first output of the source element has not been stable for the minimum hold period of time after the active edge of the second clock of the destination element, and providing an indication of the hold timing violation.

According to one embodiment, the method further comprises forcing at least one of a random value and an indeterminate onto the output of the destination element in response to identifying at least one timing violation in the BDL based circuit design due to the at least one CDC.

At least one aspect of the present disclosure is directed to a Clock Domain Crossing (CDC) simulation system comprising an interface configured to communicate with an external system and to receive a Behavioral Description Language (BDL) based circuit design from the external system, a timing analysis module configured to receive the BDL based circuit design from the interface and analyze the BDL based circuit design to identify at least one CDC within the circuit design, a test bench module configured to receive the BDL based circuit design from the interface, and to operate a test bench code to simulate the operation of the BDL based circuit design, and means for inserting code into a top level of the test bench code and for instantiating the code into lower levels of the circuit design to simulate operate of the circuit design and identify timing violations in the BDL based circuit design due to the at least one CDC.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 7 is a block diagram of computing components forming a system which may be configured to implement one or more aspects of the present invention.

DETAILED DESCRIPTION

Figure 1:
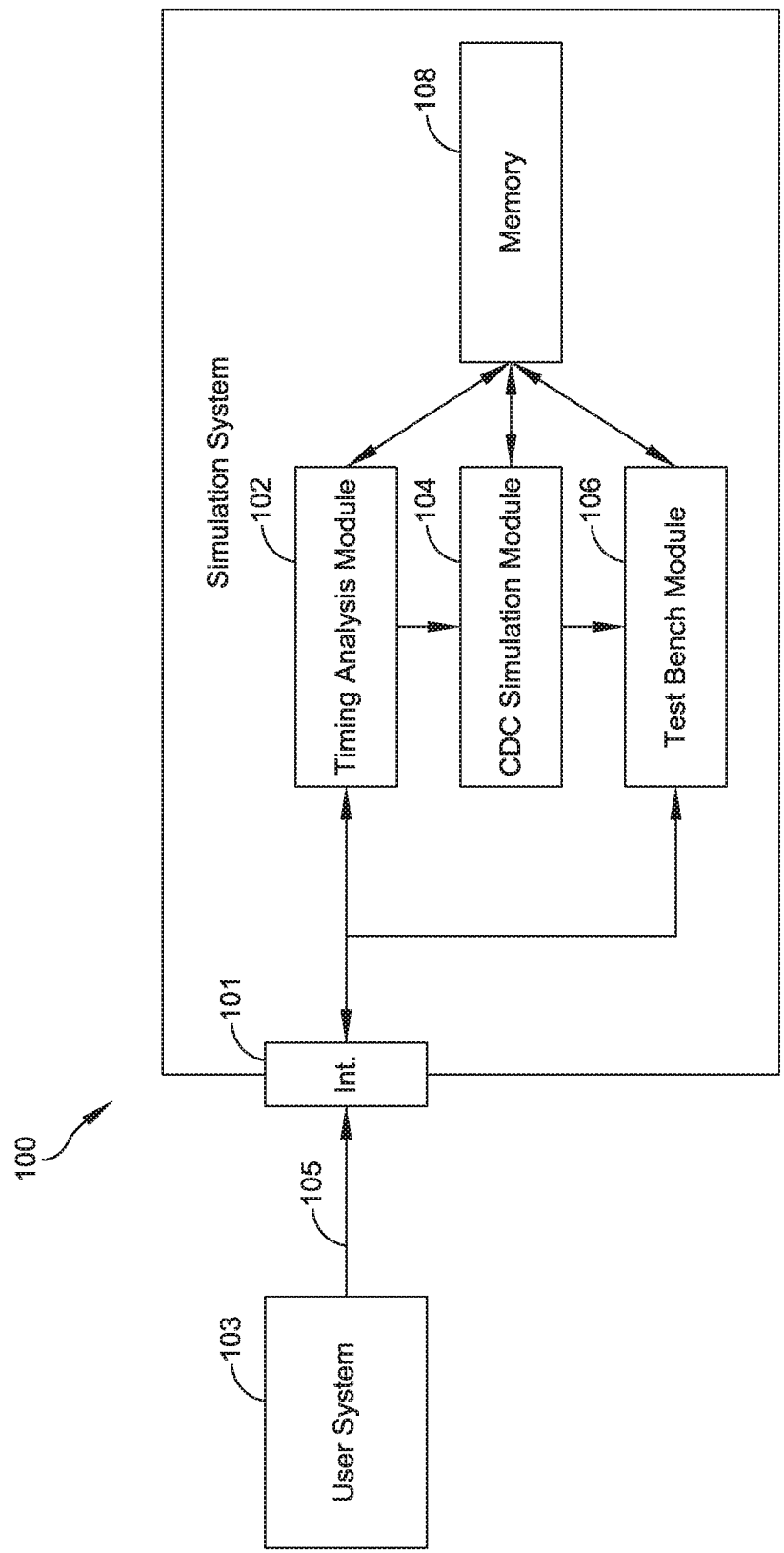
FIG. 1 is a block diagram of a simulation system in accordance with aspects of the present invention.

Different types of tools are commonly utilized to properly configure (i.e., place) the design elements (e.g., flip-flops, registers, clocks, etc.) of an HDL based circuit design to comply with defined timing constraints and test the behavior of such elements in an HDL based circuit design. For example, back-end synthesis and "place-and-route" tools take an HDL based circuit design and corresponding timing constraints as inputs and place components described in the HDL based circuit design such that all of the timing constraints are met. Simulation tools are generally utilized to simulate the behavior of an HDL based circuit design after the components of the design have been placed by the place-and-route tool.

With synchronous clocks, a typical place-and-route tool receives the clock period of a synchronous clock in a constraint file and utilizes the setup/hold requirements of design element input pins, net delays resulting from design element placement, and the clock period defined in the constraint file to configure the placement and routing of design elements in the circuit design. Upon placing and routing the design elements of the circuit design the place-and-route tool can perform timing analysis of the synchronous circuit to reveal any violation of setup/hold requirements. With synchronous derivate clocks (i.e., clocks having different frequencies or different phases that originate from the same source), a typical place-and-route tool receives a constraint related to the originating source clock. By utilizing the originating clock constraint and understanding the relationship between clock derivatives, the simulation tool can place and route the design elements of the circuit design and perform timing analysis to confirm satisfaction of all design element constraints (e.g., setup/hold requirements).

However, as asynchronous clocks (i.e. unrelated source and destination clocks originating from different clocking elements) have no relationship, signals that cross between asynchronous domains will necessarily violate the constraints of their destination timed elements. Back-end synthesis and place-and-route tools generally make no attempt to, nor have any means for, resolving such violations. For example, Clock Domain Crossings (CDC) are signal paths sourced from one clock domain that cross into another clock domain. The signal path's source is a first design element in a first clock domain (e.g., a Q output of a flip-flop) and its destination is an input to a second design element in a second clock domain (e.g., a D input of a flip flop) that has a timing requirement (e.g., a setup/hold requirement). The clock of the first design element and the clock of the second design element are asynchronous as they originate from different clocking elements.

As the signal path (i.e., CDC) that connects the first design element to the second design element crosses asynchronous clock domains, signal transitions on the signal path may violate the setup and hold requirements on the destination elements (i.e., second design element) input. More specifically, transferring signals between asynchronous clock domains may cause timing violations on the destination elements which results in destination element metastability (i.e., a condition in which the output of a timed element floats between logical 0 and logical 1). As similarly described above, elements connected by an asynchronous CDC have a relationship that can't be determined to the satisfaction of a place-and-route tool. Accordingly, place-and-route tools are typically unable to resolve CDC based timing violations and as a result, the violations generally remain unchecked by the place-and-route tools.

As described above, simulation tools are often utilized to simulate the behavior of an HDL based circuit design. However, such tools are generally run at "unit-level", meaning with no concept of real time. "Unit-level" simulations ignore actual component and net delays, and instead perform computations on active clock edges with the assumption that all timing constraints will be met. This is a simplification that reduces computational load thereby increasing speed of the simulation on the computer running the simulation tools. This tradeoff may be beneficial in fully synchronous single-clock and multiple synchronous derivative clock designs; however, unit delay simulation is unrealistically non-random when modeling CDCs in an HDL based circuit design, and as a result, can mask functional design errors.

Some common solutions to help analyze and model CDC behavior in an HDL based circuit design include the use of CDC analysis tools that substitute elements in a design to model the effects of CDCs in a simulation environment. However, such tools are generally complex and require the actual replacement of design elements to account for CDC behavior.

A relatively less complex system and process for simulating the behavior of CDCs in HDL based circuit designs is provided herein. The system for simulating the behavior of a CDC in an HDL based circuit design described herein operates by identifying CDCs in an HDL based design and inserting HDL code at the top-level of a test bench operating on the HDL based circuit design. The inserted HDL code is instantiated into the lower levels of the design hierarchy by the test bench to test for potential timing violations in the HDL based circuit design due to CDCs. The inserted HDL code takes as input the identified source-destination CDC pairs and constructs setup and hold time windows around the destination timing elements. The inserted HDL code runs during unit-level simulation of the HDL based sign, analyzes each CDC in view of the corresponding setup and hold time window, and looks for timing violations. The inserted HDL code can test/analyze the circuit design for source element clock insertion delay, destination element clock insertion delay, source-to-destination net delay of timed path, and destination register setup/hold time requirements. When a timing observation of a CDC is observed, the code either randomizes the output of the CDCs destination element or drives an HDL indeterminate ("X") onto the output of the CDCs destination element.

By implementing the HDL code at the top-level of a test bench, rather than within a design itself, the system described herein can accurately simulate CDC behavior in an HDL based design without having to change elements of the design or edit the netlist of the design. In addition, as the system does not require changes be made to the design to accurately reflect CDC behavior, the system may operate more quickly/efficiently than traditional CDC simulation tools and can also allow for the inserted code to be selectively implemented on an element by element basis.

FIG. 1 is a block diagram of a simulation system 100 according to aspects described herein. According to at least one embodiment, the simulation system 100 includes a timing analysis module 102, a CDC simulation module 104, a test bench module 106, and a memory module 108. The simulation system 100 may also include an interface 101. The timing analysis module 102 is configured to communicate with the CDC simulation module 104 and the interface 101. The CDC simulation module 104 is configured to communicate with the timing analysis module 102 and the test bench module 106. The test bench module 106 is configured to communicate with the CDC simulation module 104 and the interface 101. In one embodiment, the interface 101 is configured to communicate with at least one system external the simulation system 100. For example, the interface 101 can be configured to communicate with an external system operated by a user 103 via a connection link 105. In one embodiment, the interface 101 can communicate with the user system 103 via a network 105. The network 105 can be any appropriate type of network (e.g., a Local Area Network (LAN), a Wide Area Network (WAN), the Internet, etc.) The interface 101 can also communicate with the user system 103 directly (e.g., via a direct wired connection 105). Operation of the simulation system 100 is described below.

When the testing of an HDL based circuit design is desired by a user, the user can transmit the circuit design from a system operated by the user 103 to the simulation system 100 via the interface 101. In one embodiment, the user system 103 transmits the circuit design to the simulation system 100 via a network 105 and the interface 101. In another embodiment, the user system 103 uploads the circuit design directly to the simulation system 100 via a direct wired connection 105 and the interface 101.

The HDL based circuit design provided to the simulation system 100 includes a timing constraints file. The timing constraints file defines timing constraints specified by the user for proper operation of the circuit design. Such timing constraints are used to specify the timing characteristics of the design Timing constraints can impact internal timing interconnections, delays through logic, and delays between design elements (e.g., flip-flops and registers). Timing constraints can also define period constraints for each clock in the design, setup times for each input, and output constraints for each output.

The timing analysis module 102 of the simulation system 100 operates as a place-and-route tool to analyze the received HDL based circuit design (and corresponding timing constraint file) in order to identify any unrelated (i.e., asynchronous) clocks in the design. The timing analysis module 102 identifies clocks as unrelated when it is unable to satisfy the timing constraints in the timing constraints file given the provided design elements in the HDL based circuit design. Based on the identification of any unrelated clocks, the timing analysis module 102 also identifies any CDCs. A timing analysis report (including the identification of any unrelated clocks and/or the identification of any CDCs in the design) is provided by the timing analysis module 102 to the CDC simulation module 104. According to at least one embodiment, for each identified CDC, the timing analysis report includes an identification (e.g., address) of the source clock of the CDC, an identification (e.g., address) of the destination clock of the CDC, an identification (e.g., address) of the source design element of the CDC, and an identification (e.g., address) of the destination design element of the CDC.

Figure 2:
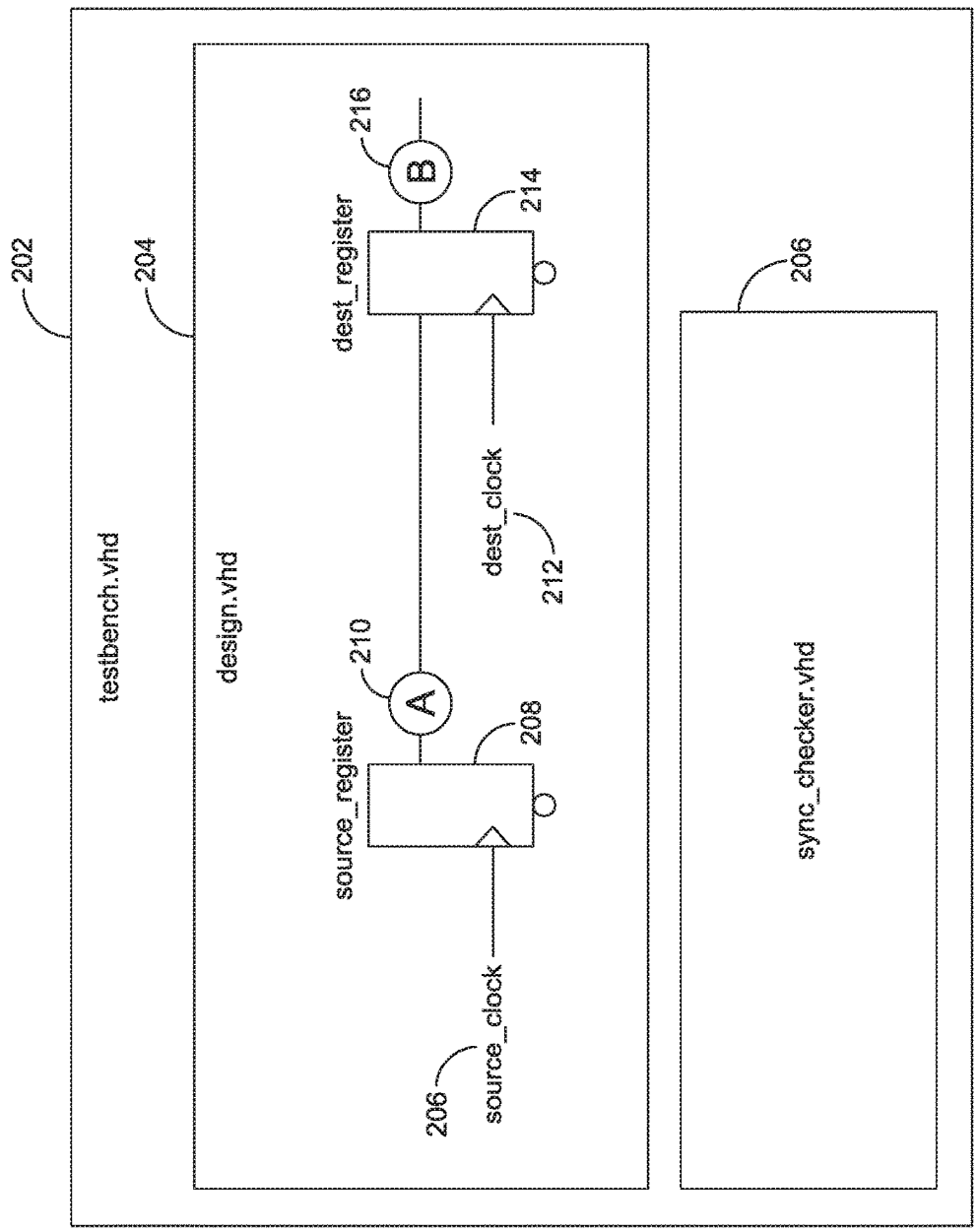
FIG. 2 is a block diagram illustrating a relationship between a test bench module, a CDC simulation module, and a received circuit design in accordance with aspects of the present invention.

The HDL based circuit design provided to the simulation system 100 is also provided to the test bench module 106 for simulation and testing of the circuit design. FIG. 2 is a block diagram illustrating a relationship between the test bench module 106, the CDC simulation module 104, and the received HDL based circuit design. As shown in FIG. 2, the test bench module 106 implements test bench code 202 (testbench.vhd) that operates to simulate the operation of the HDL based circuit design 204 (design.vhd). FIG. 2 illustrates one embodiment of an HDL based circuit design 204 for illustrative purposes only. The HDL based circuit design 204 of FIG. 2 includes a source register 208 having a clock input coupled to a source clock 206. An output "A" 210 of the source register 208 is coupled to an input of a destination register 214. The destination register 214 has an output "B" 216 and a clock input coupled to a destination clock 212. The source clock 206 and the destination clock 212 are unrelated (asynchronous). Accordingly, the connection between the output "A" of the source register 208 and the input of the destination register 214 is a CDC.

Based on the CDCs identified in the report received from the timing analysis module 102, the CDC simulation module 104 inserts code 206 (sync_checker.vhd) into the top level of the test bench code 202 to accurately simulate the behavior of each CDC when the test bench module 106 is simulating the circuit design 204. For example, in response to the HDL based circuit design 204 including a CDC as shown in FIG. 2, the CDC simulation module 104 inserts code 206 into the top level of the test bench code 202 to operate the test bench module 106 to accurately simulate the behavior of the CDC. The inserted code 206 is instantiated into the lower levels of the design hierarchy by the test bench module 106 to model the behavior of the CDC and check for timing violations (e.g., setup and hold time violations) as a result of the CDC.

Figure 3:
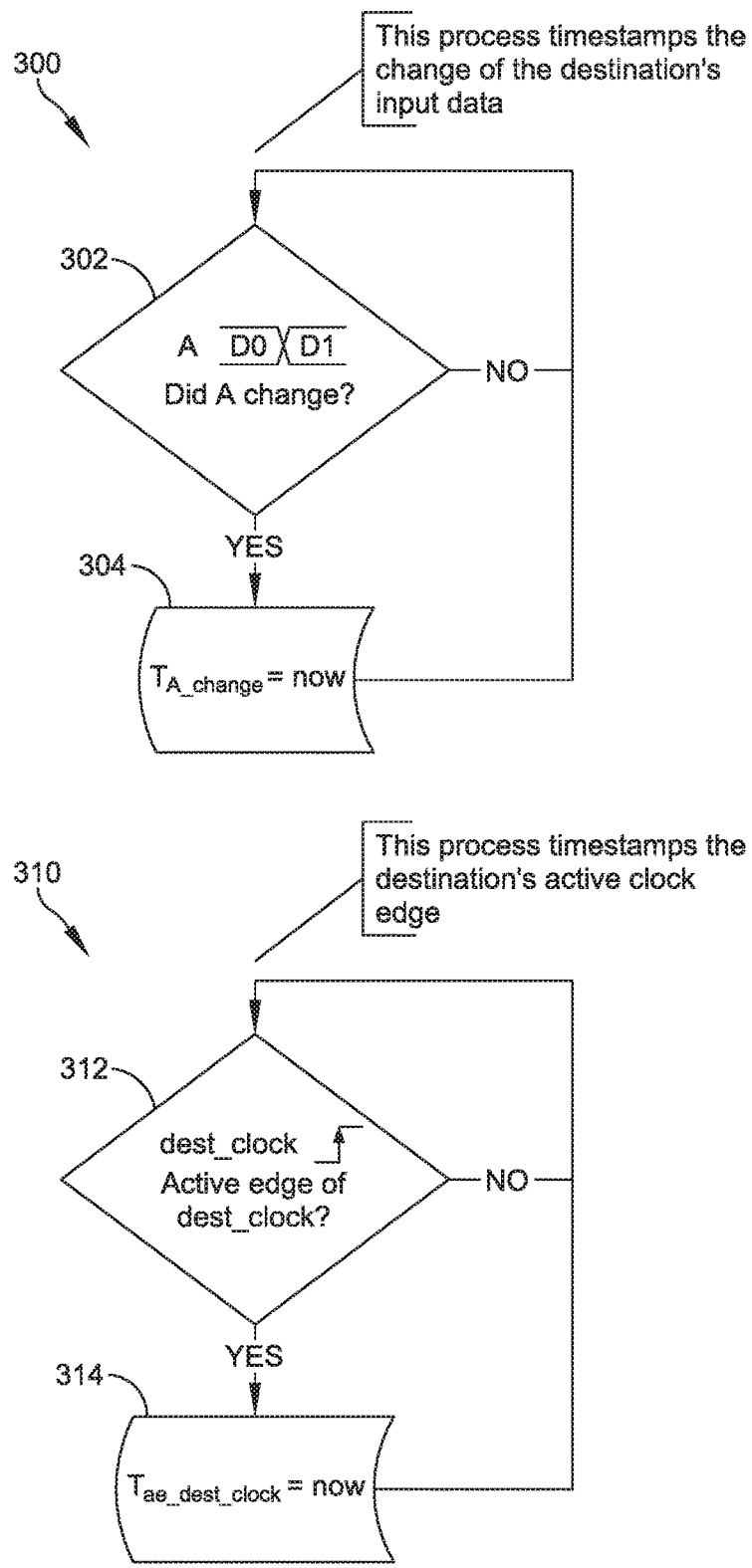
FIG. 3 includes flow charts illustrating operation of a test bench module in accordance with aspects of the present invention.
Figure 4:
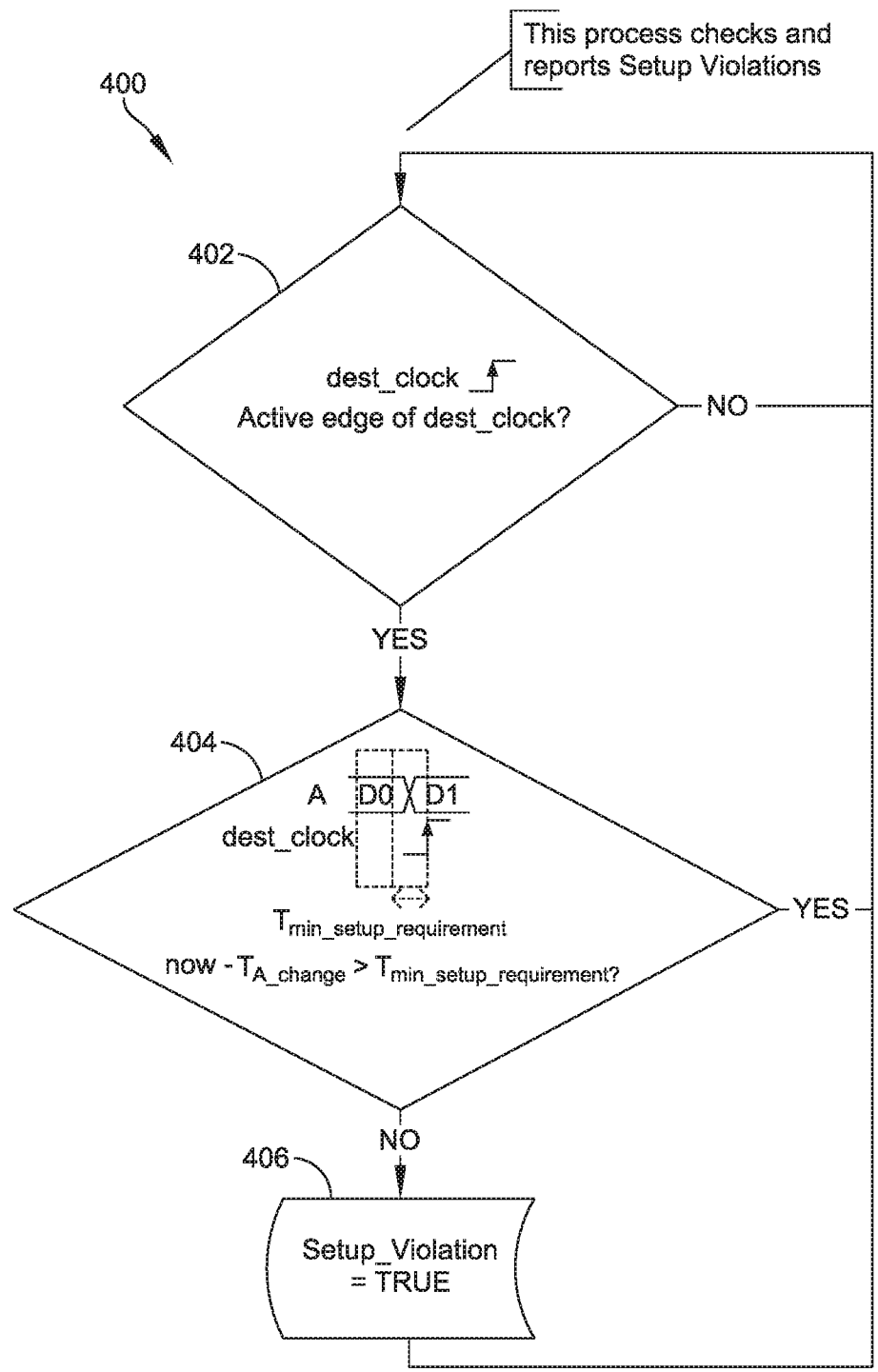
FIG. 4 includes a flow chart illustrating operation of a test bench module in accordance with aspects of the present invention.
Figure 5:
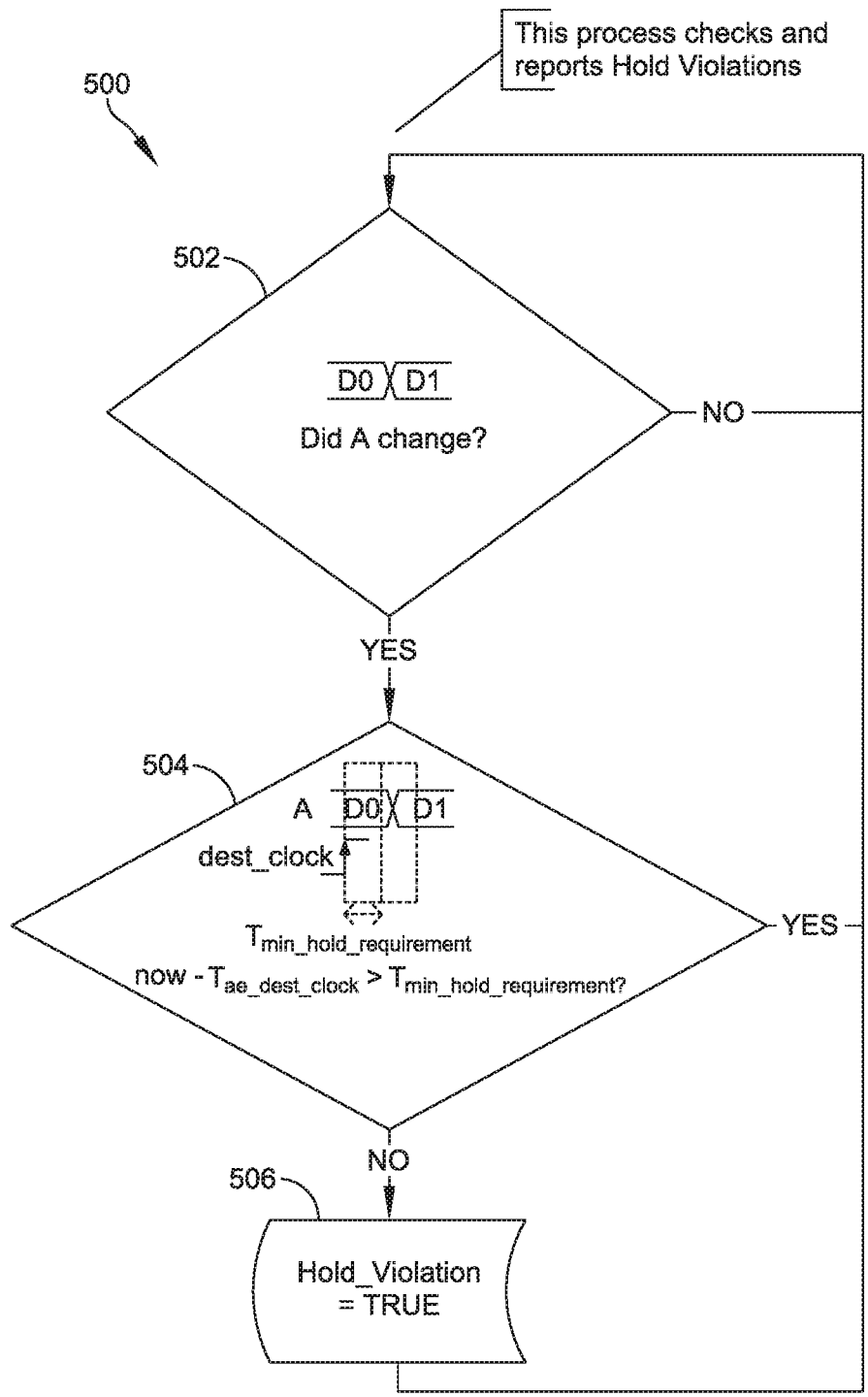
FIG. 5 includes another flow chart illustrating operation of a test bench module in accordance with aspects of the present invention.

The code 206 inserted into the top level of the test bench code 206 operates the test bench module 106 to check for potential timing violations by looking for source data (i.e., output "A" 210) changing within a defined window of the active edge of the destination clock 212. More specifically, the code 206 operates the test bench module 106 to check for potential timing violations by timestamping a change of destination element 214 input data 210, timestamping the destination element's active clock 212 edge, checking and reporting destination element 214 setup violations, and checking and reporting destination element 214 hold violations. FIG. 3-5 include flow charts that illustrate such processes operated by the test bench module 106 based on the code inserted into the test bench code 206 by the CDC simulation module 104.

FIG. 3 includes a first flow chart 300 illustrating operation of the test bench module 106 to timestamp a change of destination element 214 input data 210. At block 302, the test bench module 106 monitors the input data "A" 210 of the destination element 214 and determines if the input data "A" 210 has changed (e.g. transitioned between logic 0 and logic 1). In response to determining that the input data "A" 210 has not changed, the test bench module 106 continues to monitor the input data "A" 210 for a change at block 302. At block 304, in response to determining that the input data "A" 210 has changed, the test bench module 106 timestamps the change (e.g., sets the variable $T_{A\_change}$ to a current time value).

FIG. 3 also includes a second flow chart 310 illustrating operation of the test bench module 106 to timestamp the destination element's active clock 212 edge. At block 312, the test bench module 106 monitors the destination clock 212 and determines if an active edge of the destination clock 212 has arrived. In response to determining that an active edge of the destination clock 212 has not arrived, the test bench module 106 continues to monitor the destination clock 212 for an active edge at block 312. At block 314, in response to determining that an active edge of the destination clock 212 has arrived, the test bench module 106 timestamps the active edge of the destination clock 212 (e.g., sets the variable $T_{ae\_dest\_clock}$ to a current time value).

FIG. 4 is a flow chart 400 illustrating operation of the test bench module 106 to check and report destination element 214 setup violations. A setup violation of the destination element 214 exists when the input data "A" 210 of the destination element 214 has not been stable for a minimum amount of time before the rising edge of the destination clock 212 (i.e., stable within a setup window defined before the rising edge). For example, at block 402, the test bench module 106 monitors the destination clock 212 and determines if an active edge of the destination clock 212 has arrived. In response to determining that an active edge of the destination clock 212 has not arrived, the test bench module 106 continues to monitor the destination clock 212 for an active edge at block 402. At block 404, in response to determining that an active edge of the destination clock 212 has arrived, the test bench module 106 compares the amount of time between the active edge of the destination clock 212 and the (previously timestamped) change in input data "A" 210 ($T_{A\_change}$) to a minimum setup requirement ($T_{min\_setup\_requirement}$) of the destination element 214. In response to a determination that the input data "A" 210 was stable for at least the minimum setup requirement before the active edge (i.e., current time−$T_{A\_change} > T_{min\_setup\_requirement}$), the test bench module 106 continues to monitor the destination clock 212 for an active edge at block 402. In response to a determination that the input data "A" 210 was not stable for at least the minimum setup requirement before the active edge (i.e., current time−$T_{A\_change} < T_{min\_setup\_requirement}$) at block 406 the test bench module 106 reports a setup violation by setting the Setup_Violation flag as TRUE.

FIG. 5 is a flow chart 500 illustrating operation of the test bench module 106 to check and report destination element 214 hold violations. A hold violation of the destination element 214 exists when the input data "A" 210 of the destination element 214 is not stable for a minimum amount of time after the rising edge of the destination clock 212 (i.e., stable within a hold window defined after the rising edge). For example, at block 502, the test bench module 106 monitors the input data "A" 210 of the destination element 214 and determines if the input data "A" 210 has changed. In response to determining that the input data "A" 210 has not changed, the test bench module 106 continues to monitor the monitor the input data "A" 210 for a change at block 502. At block 504, in response to determining that the input data "A" 210 has changed, the test bench module 106 compares the amount of time between the change in the input data "A" 210 and the (previously timestamped) active edge of the destination clock 212 to a minimum hold requirement ($T_{min\_hold\_requirement}$). In response to a determination that the input data "A" was stable for at least the minimum hold requirement after the active edge (i.e., current time−$T_{ae\_dest\_clock} > T_{min\_hold\_requirement}$), the test bench module 106 continues to monitor the input data "A" 210 of the destination element 214 for a change at block 502. In response to a determination that the input data "A" was not stable for at least the minimum hold requirement after the active edge (i.e., current time−$T_{ae\_dest\_clock} < T_{min\_hold\_requirement}$) at block 506 the test bench module 106 reports a hold violation by setting the Hold_Violation flag as TRUE.

Figure 6:
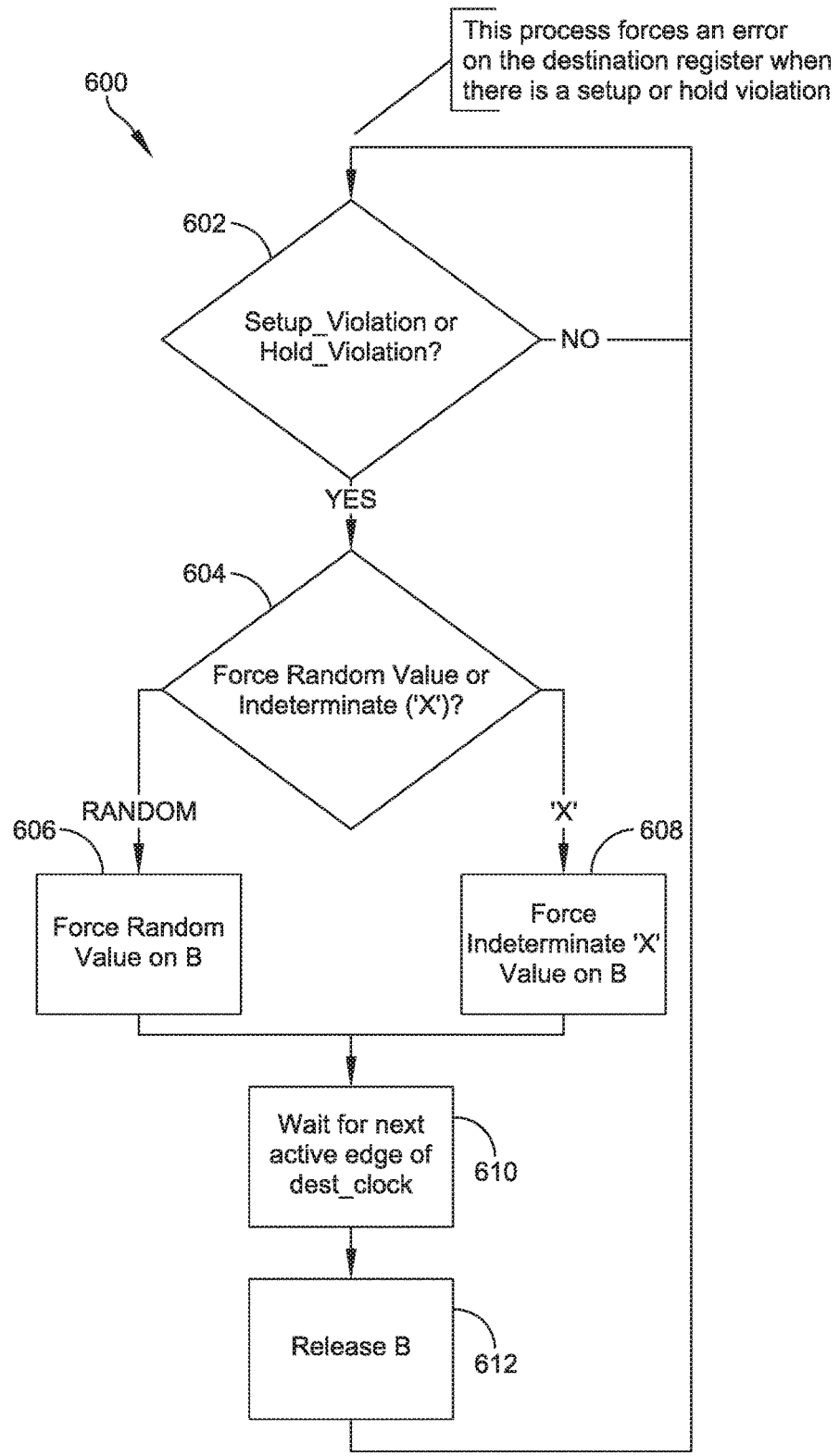
FIG. 6 includes another flow chart illustrating operation of a test bench module in accordance with aspects of the present invention.

FIG. 6 is a flow chart illustrating operation of the test bench module 106 upon identification of a Setup and/or Hold timing violation. At block 602, the test bench module 106 determines if either the Setup_Violation flag or the Hold_Violation flag is TRUE. In response to a determination that neither the Setup_Violation flag or the Hold_Violation flag is TRUE, the test bench module 106 continues to monitor the Setup_Violation and Hold_Violation flags for an indication of a violation. At block 604, in response to a determination that either the Setup_Violation flag or the Hold_Violation flag is TRUE, the test bench module 106 determines whether to force a random value onto the output "B" 216 of the destination element 214 or force an indeterminate 'X' value onto the output "B" 216 of the destination element 214. At block 606, the test bench module 106 forces a random value onto the output "B" 216 of the destination element 214. At block 608, the test bench module 106 forces an indeterminate 'X' value onto the output "B" 216 of the destination element 214. According to one embodiment, the test bench module 106 is configured to selectively perform the operation of either block 606 or block 608; however, in at least one embodiment, the test bench module 106 is configured to perform only the operation of one of block 606 or block 608.

At block 610, the test bench module 106 monitors the destination clock 212 for the next active edge of the destination clock 212. At block 612, upon identifying the next active edge of the destination clock 212, the test bench module 106 releases the output "B" 216 of the destination element 214 and again determines if either the Setup_Violation flag or the Hold_Violation flag is TRUE at block 602.

By instantiating into the lower levels of the hierarchy of a circuit design to model the behavior of the CDC, checking for timing violations (e.g., setup and hold time violations) as a result of the CDC, and subsequently forcing either a random value or an indeterminate 'X' value onto the output "B" 216 of the destination element 214, the random nature of the CDC can be more accurately simulated. As such, the operation of the HDL based circuit design including the CDC can be more accurately simulated by the test bench module 106.

An instantiation example of the code 206 inserted into the test bench code 202 of the test bench module 106 by the CDC simulation module 104 is shown below where the source/destination clocks and source/destination data are string type generics from a timing report received from the timing analysis module 102 as described above:

```
sync_checker_vhd #(
.src_clk("/sbc_tb/sbc1_sbc_fpga/spw1_node/MAKE_DS_LINK/SYNC_MOD/DS_CLK_IN"),
.src_dat("/sbc_tb/sbc1_sbc_fpga/spw1_node/MAKE_DS_LINK/SYNC_MOD/RX_DATA_A"),
.dst_clk("/sbc_tb/sbc1_sbc_fpga/spw1_node/MAKE_DS_LINK/INCNTRL/CLK"),
.dst_dat("/sbc_tb/sbc1_sbc_fpga/spw1_node/MAKE_DS_LINK/INCNTRL/iRX_DATA_A"),
.DATA_WIDTH(8),
.error_window(0)
) sbc1_node1a(.sync_checker_enable(1'b1),
       .rand_high_x_low(1'b0));
```

FIG. 7 illustrates an example block diagram of computing components forming a system 700 which may be configured to implement one or more aspects disclosed herein. For example, the system 700 may be communicatively coupled to the simulation system 100 or included within the simulation system 100. The system 700 may also be configured operate a simulation system 100 as discussed above.

The system 700 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 700 may include specially-programmed, special-purpose hardware, for example, an application-specific integrated circuit (ASIC). Various aspects of the present disclosure may be implemented as specialized software executing on the system 700 such as that shown in FIG. 7.

The system 700 may include a processor/ASIC 706 connected to one or more memory devices 710, such as a disk drive, memory, flash memory or other device for storing data. Memory 710 may be used for storing programs and data during operation of the system 700. Components of the computer system 700 may be coupled by an interconnection mechanism 708, which may include one or more buses (e.g., between components that are integrated within a same machine) and/or a network (e.g., between components that reside on separate machines). The interconnection mechanism 708 enables communications (e.g., data, instructions) to be exchanged between components of the system 700. The system 700 also includes one or more input devices 704, which may include for example, a keyboard or a touch screen. The system 700 includes one or more output devices 702, which may include for example a display. In addition, the computer system 700 may contain one or more interfaces (not shown) that may connect the computer system 700 to a communication network, in addition or as an alternative to the interconnection mechanism 708.

The system 700 may include a storage system 712, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 710 that allows for faster access to the information by the processor/ASIC than does the medium. This memory 710 may be a volatile, random access memory such as a dynamic random access memory (DRAM) or static memory (SRAM). It may be located in storage system 712 or in memory system 710. The processor 706 may manipulate the data within the integrated circuit memory 710 and then copy the data to the storage 712 after processing is completed. A variety of mechanisms are known for managing data movement between storage 712 and the integrated circuit memory element 710, and the disclosure is not limited thereto. The disclosure is not limited to a particular memory system 710 or a storage system 712.

The system 700 may include a computer platform that is programmable using a high-level computer programming language. The system 700 may be also implemented using specially programmed, special purpose hardware, e.g. an ASIC. The system 700 may include a processor 706, which may be a commercially available processor such as the well-known Pentium class processor available from the Intel Corporation. Many other processors are available. The processor 706 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

According to one embodiment, the elements of the simulation system (e.g., the timing analysis module 102, CDC simulation module 104, test bench module 106, memory 108, interface 101) are operated by the same system (e.g., by the same processor). However, in at least one other embodiment, the elements of the simulation system are operated across different systems of a distributed computer system that are configured to communicate via a network and/or via dedicated lines.

As described above, the simulation system is configured to operate on an HDL based circuit design; however, in other embodiments, the system is configured to operate on another appropriate Behavioral Description Language (BDL).

As also described above, the simulation system 100 includes the timing analysis module 102, the CDC simulation module 104, and the test bench module 106; however, in at least one embodiment, the simulation system 100 only includes the CDC simulation module 104 and the test bench module 106 and is configured to receive a timing report from an external timing analysis module (e.g., via the interface 101).

Any one of the modules in the simulation system (e.g., the timing analysis module 102, CDC simulation module 104, test bench module 106) can also be configured to communicate with, store information in, and retrieve information from the memory module 108. Any appropriate information utilized by any one of the simulation system modules can be stored in the memory module 108.

A relatively less complex system and process for simulating the behavior of CDCs in HDL based circuit designs is provided herein. The system for simulating the behavior of a CDC in an HDL based circuit design described herein operates by identifying CDCs in an HDL based design and inserting HDL code at the top-level of a test bench operating on the HDL based circuit design. The inserted HDL code is instantiated into the lower levels of the design hierarchy to test for potential timing violations in the HDL based circuit design due to CDCs. When a timing observation of a CDC is observed, the code either randomizes the output of the CDCs destination element or drives an HDL indeterminate ("X") onto the output of the CDCs destination element.

By implementing the HDL code at the top-level of a test bench, rather than within a design itself, the system described herein can accurately simulate the relatively random CDC behavior in an HDL based design without having to change elements of the design or edit the netlist of the design. In addition, as the system does not require changes be made to the design to accurately reflect CDC behavior, the system may operate more quickly/efficiently than traditional CDC simulation tools and can also allow for the inserted code to be selectively implemented on an element by element basis.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A Clock Domain Crossing (CDC) simulation system comprising:
   an interface configured to communicate with an external system and to receive a Behavioral Description Language (BDL) based circuit design from the external system;
   a timing analysis module configured to receive the BDL based circuit design from the interface, analyze the BDL based circuit design to identify at least one CDC within the circuit design, and generate a report including information related to the at least one CDC;
   a CDC simulation module configured to communicate with the timing analysis module and to receive the report from the timing analysis module; and
   a test bench module configured to communicate with the CDC simulation module and the interface, to receive the BDL based circuit design from the interface, and to operate a test bench code to simulate the operation of the BDL based circuit design,
   wherein the CDC simulation module is further configured to edit a top level of the test bench code, based on the received report, such that the test bench module is configured to identify timing violations in the BDL based circuit design due to the at least one CDC,
   wherein, in analyzing the BDL based circuit design to identify the at least one CDC within the circuit design, the timing analysis module is further configured to:
   identify a source element of the at least one CDC having a first output;
   identify a destination element of the at least one CDC having a second output;
   identify a first clock of the source element;
   identify a second clock of the destination element, the first clock and the second clock being asynchronous; and
   include identifications of the source element, the destination element, the first clock, and the second clock in the report,
   wherein, in editing the top level of the test bench code, based on the received report, such that the test bench module is configured to identify timing violations in the BDL based circuit design as a result of the at least one CDC, the CDC simulation module is further configured to edit the top level of the test bench code such that the test bench module is configured to:
   monitor the first output of the source element;
   monitor the second clock of the destination element;
   timestamp a change in the first output of the source element;
   identify an active edge of the second clock of the destination element;
   determine whether an amount of time between the timestamped change in the first output of the source element and the identified active edge of the second clock of the destination element is greater than a minimum setup period of time;
   identify a setup timing violation in response to the amount of time between the timestamped change in the first output of the source element and the identified active edge of the second clock of the destination element being less than the minimum setup period of time; and
   provide an indication of the setup timing violation.

2. The CDC simulation system of claim 1, wherein the BDL based circuit design is a Hardware Description Language (HDL) based circuit design.

3. The CDC simulation system of claim 2, wherein the HDL based circuit design is an HDL based circuit design of a Field-Programmable Gate Array (FPGA).

4. The CDC simulation system of claim 1, wherein in editing the top level of the test bench code such that the test bench module is configured to identify timing violations in the BDL based circuit design, the CDC simulation module is further configured to edit the top level of the test bench code such that the test bench module is configured to:
   determine whether the first output of the source element has been stable for a minimum hold period of time after the active edge of the second clock of the destination element; and
   identify a hold timing violation in response to a determination that the first output of the source element has not been stable for the minimum hold period of time after the active edge of the second clock of the destination element.

5. The CDC simulation system of claim 4, wherein in editing the top level of the test bench code such that the test bench module is configured to determine whether the first output of the source element has been stable for a minimum hold period of time after the active edge of the second clock of the destination element, the CDC simulation module is further configured to edit the top level of the test bench code such that the test bench module is configured to:
   timestamp the active edge of the second clock of the destination element;
   identify a change in the first output of the source element; and
   determine whether an amount of time between the timestamped active edge of the second clock of the destination element and the change in the first output of the source element is greater than the minimum hold period of time.

6. The CDC simulation system of claim 5, wherein in editing the top level of the test bench code such that the test bench module is configured to identify the hold timing violation in response to the determination that the first output of the source element has not been stable for the minimum hold period of time after the active edge of the second clock of the destination element, the CDC simulation module is further configured to edit the top level of the test bench code such that the bench module is configured to:
identify the hold timing violation in response to the amount of time between the timestamped active edge of the second clock of the destination element and the change in the first output of the source element is less than the minimum hold period of time; and
provide an indication of the setup timing violation.

7. The CDC simulation system of claim 1, wherein the CDC simulation module is further configured to edit the top level of the test bench code such that the test bench module is configured to force a random value onto the output of the destination element of the at least one CDC in response to identifying at least one timing violation in the BDL based circuit design due to the at least one CDC.

8. The CDC simulation system of claim 1, wherein the CDC simulation module is further configured to edit the top level of the test bench code such that the test bench module is configured to force an indeterminate onto the output of the destination element of the at least one CDC in response to identifying at least one timing violation in the BDL based circuit design due to the at least one CDC.

9. A method for simulating the behavior of Clock Domain Crossings (CDC) in a Behavioral Description Language (BDL) based circuit design, the method comprising:
receiving the BDL based circuit design;
analyzing the BDL based circuit design to identify information related to at least one CDC within the circuit design;
operating a test bench code of a test bench module to simulate operation of the BDL based circuit design;
inserting code into a top level of the test bench code based on the information related to the at least one CDC within the circuit design; and
instantiating the inserted code into lower levels of the circuit design to identify timing violations in the BDL based circuit design due to the at least one CDC,
wherein, analyzing the BDL based circuit design to identify information related to at least one CDC within the circuit design includes:
identifying a source element of the at least one CDC having a first output;
identifying a destination element of the at least one CDC having a second output;
identifying a first clock of the source element; and
identifying a second clock of the destination element, the first clock and the second clock being asynchronous, and
wherein, instantiating the inserted code into the lower levels of the circuit design to identify timing violations in the BDL based circuit design due to the at least one CDC includes:
monitoring the first output of the source element;
monitoring the second clock of the destination element;
determining whether the first output of the source element has been stable for a minimum setup period of time before an active edge of the second clock of the destination element;
identifying a setup timing violation in response to a determination that the first output of the source element has not been stable for the minimum setup period of time before the active edge of the second clock of the destination element; and
providing an indication of the setup timing violation.

10. The method of claim 9, wherein identifying timing violations in the BDL based circuit design based on the first output of the source element and the second clock of the destination element includes:
determining whether the first output of the source element has been stable for a minimum hold period of time after the active edge of the second clock of the destination element;
identifying a hold timing violation in response to a determination that the first output of the source element has not been stable for the minimum hold period of time after the active edge of the second clock of the destination element; and
providing an indication of the hold timing violation.

11. The method of claim 9, further comprising forcing at least one of a random value and an indeterminate onto the output of the destination element in response to identifying at least one timing violation in the BDL based circuit design due to the at least one CDC.

12. A Clock Domain Crossing (CDC) simulation system comprising:
an interface configured to communicate with an external system and to receive a Behavioral Description Language (BDL) based circuit design from the external system;
a timing analysis module configured to receive the BDL based circuit design from the interface and analyze the BDL based circuit design to identify at least one CDC within the circuit design;
a test bench module configured to receive the BDL based circuit design from the interface, and to operate a test bench code to simulate the operation of the BDL based circuit design; and
means for inserting code into a top level of the test bench code, for instantiating the code into lower levels of the circuit design to simulate operation of the circuit design, for determining whether a data output of a source element of the at least one CDC has been stable for a minimum setup period of time before an active edge of a clock of a destination element of the at least one CDC, for identifying a setup timing violation in response to a determination that the data output of the source element has not been stable for the minimum setup period of time before the active edge of the clock of the destination element, and for providing an indication of the setup timing violation.

* * * * *